(12) United States Patent
Takeda (10) Patent No.: US 7,287,669 B2
(45) Date of Patent: Oct. 30, 2007

(54) ARTICLE TRANSFER DEVICE (75) Inventor: Kengo Takeda, Tokyo (JP)

(73) Assignee: Aruze Corp., Tokyo (JP)

( * ) Notice: Subject to any disclaimer, the term of this patent is extended or adjusted under 35 U.S.C. 154(b) by 251 days.

(21) Appl. No.: 11/081,812

(22) Filed: Mar. 17, 2005

(65) Prior Publication Data
US 2005/0205504 A1 Sep. 22, 2005

(30) Foreign Application Priority Data
Mar. 18, 2004 (JP) ............................. 2004-078524

(51) Int. Cl.
*A47F 1/00* (2006.01)
(52) U.S. Cl. .................. 221/312 A; 221/155; 221/126
(58) Field of Classification Search ................ 221/213, 221/214, 312 A
See application file for complete search history.

(56) References Cited

U.S. PATENT DOCUMENTS

| | | | | |
|---|---|---|---|---|
| 3,248,005 A | * | 4/1966 | Joschko | 221/13 |
| 3,294,281 A | * | 12/1966 | Schlaf | 221/9 |
| 3,355,064 A | * | 11/1967 | Schlaf | 221/14 |
| 3,572,546 A | * | 3/1971 | Schlaf | 221/75 |
| 4,180,182 A | * | 12/1979 | Fish et al. | 221/75 |
| 4,363,423 A | * | 12/1982 | Larsen | 221/82 |
| 4,638,922 A | * | 1/1987 | Stoltz | 221/75 |
| 4,995,531 A | * | 2/1991 | Summers | 221/75 |
| 5,153,415 A | * | 10/1992 | Samejima et al. | 235/98 C |
| 6,917,543 B2 | * | 7/2005 | Sato | 365/185.22 |

FOREIGN PATENT DOCUMENTS

| | | |
|---|---|---|
| JP | 10-116386 | 5/1998 |
| JP | 2001-076242 | 3/2001 |
| JP | 2002-150397 | 5/2002 |
| JP | 2002-157641 | 5/2002 |

\* cited by examiner

*Primary Examiner*—Gene O. Crawford
*Assistant Examiner*—Timothy Waggoner
(74) *Attorney, Agent, or Firm*—Leydig, Voit & Mayer, Ltd.

(57) ABSTRACT

An article transfer device which transfers articles using hanger rods each of which includes helical ridges or helical grooves, wherein the article transfer device can ensure the sufficient number of articles to be suspended even when a depth of a housing is narrowed and, at the same time, can facilitate the observation of a front surface of each article. An article transfer device includes a plurality of hanger rods each of which forms helical ridges thereon and has a length sufficient to allow the suspending of a plurality of articles therefrom, a driver which rotates the respective hanger rods on the respective axes thereof, and a housing which accommodates the respective hanger rods, and the driver therein, wherein the respective hanger rods have axes thereof arranged obliquely with respect to the front-to-rear direction of the housing.

8 Claims, 11 Drawing Sheets

ARTICLE TRANSFER DEVICE

CROSS-REFERENCES TO THE RELATED APPLICATIONS

This application is based upon and claims the priority from a prior Japanese patent application No. 2004-078524, filed on Mar. 18, 2004, in Japan, entire contents of which are incorporated herein by reference.

This application is related to a co-pending U.S. patent application referred to as a prior Japanese patent application No. 2004-078479 filed in Japan on Mar. 18, 2004.

BACKGROUND OF THE INVENTION

1. Field of the Invention

The present invention relates to an article transfer device which transfers articles such as commodities, display products or the like in a suspended manner.

2. Related Art

Conventionally, there has been known an article transfer device which transfers articles such as commodities, display products or the like in a suspended manner. For example, there has been known a vending machine in which commodities are suspended from hanger rods each of which includes helical ridges or helical grooves which extend spirally or helically along an axis thereof, the hanger rods are rotated about axes thereof thus transferring the commodities while guiding the commodities using the helical ridges or the helical groove and allowing the falling and the takeout of the commodities. With respect to this type of vending machine, conventionally, in Japanese laid-open Patent Publication Hei10(1998)-116386, for example, there has been disclosed a vending machine in which helical racks which sequentially shorten lengths thereof from above to below are arranged vertically and commodity holding lugs which hold thin commodities such as gift coupons on each helical rack are suspended and transferred.

SUMMARY OF THE INVENTION

However, the article transfer device which transfers the articles such as commodities or the like using the hanger rods having the helical ridges or the helical grooves including this type of vending machine has following drawbacks conventionally.

The hanger rods and constitutional elements such as a motor for rotatably driving the hanger rods which are served for the transfer of articles are accommodated in a housing. To accommodate the plurality of hanger rods in the inside of the housing, a plurality of hanger rods are arranged vertically or horizontally with an interval which is determined by taking a size of the articles to be suspended into consideration.

However, to increase the number of articles to be suspended from each hanger rod as many as possible, it is necessary to elongate a length of the hanger rod and hence, it is necessary to increase a depth of the housing corresponding to the length of the hanger rod. Accordingly, in an attempt to elongate the length of the hanger rods in a state that the hanger rods are arranged vertically as wall as horizontally, not only a height and a width of the housing are increased but also the depth of the housing is increased and hence, an extra space becomes necessary to install the article transfer device.

Further, although each hanger rod includes the helical ridges or the like which transfer articles thereon, since the helical ridges have a helical shape, the helical ridges are arranged obliquely with respect to an axis of the hanger rod. When the articles are suspended from the hanger rod, since the articles are also guided by the helical ridges or the like, the articles are arranged in the direction along the helical ridges or the like. Accordingly, to observe a state in which a plurality of packed articles which are packed in boxes are suspended from the hanger rod from a front surface of the housing, the directions of the boxes of respective articles are not directed toward the front surface of the housing and are arranged obliquely from the axis of the hanger rod and hence, there arises a drawback that it is difficult to observe a front surface of the article.

Accordingly, the present invention has been made to overcome the above-mentioned drawbacks and it is an object of the present invention to provide an article transfer device which transfers articles using hanger rods each of which includes helical ridges or helical grooves, wherein the article transfer device can ensure the sufficient number of articles to be suspended even when a depth of a housing is narrowed and, at the same time, can facilitate the observation of a front surface of each article.

To overcome the above-mentioned drawbacks, the present invention provides an article transfer device which includes a plurality of hanger rods each of which has a length sufficient to allow the suspending of a plurality of articles therefrom and forms helical ridges or helical grooves which spirally extend along an axis thereof on a surface thereof; a driver which rotates the respective hanger rods on the respective axes thereof; and a housing which accommodates the respective hanger rods, and the driver therein, wherein the respective hanger rods have axes thereof arranged obliquely with respect to the front-to-rear direction of the housing.

In this article transfer device, since the hanger rods have axes thereof arranged obliquely with respect to the front-to-rear direction of the housing, it is possible to narrow a depth of the housing compared to a case in which the hanger rods are arranged in the same direction as the front-to-rear direction of the housing. Further, by arranging the axes of the hanger rods obliquely, it is possible to allow the suspended articles to directly face a front surface of the housing.

BRIEF DESCRIPTION OF THE DRAWINGS

FIG. 5A and FIG. 5B are views showing a hanger rod and a commodity which is suspended from the hanger rod, wherein

FIG. 8A and FIG. 8B are views schematically showing article transfer devices, wherein

FIG. 9A and FIG. 9B are views showing commodities which are suspended from the article transfer devices according to this embodiment, wherein

DESCRIPTION OF THE PREFERRED EMBODIMENTS

Hereinafter, embodiments of the present invention are explained. Here, same symbols are used to indicate identical elements and their repeated explanation is omitted.

(Overall Constitution of the Article Transfer Device)

Figure 1:
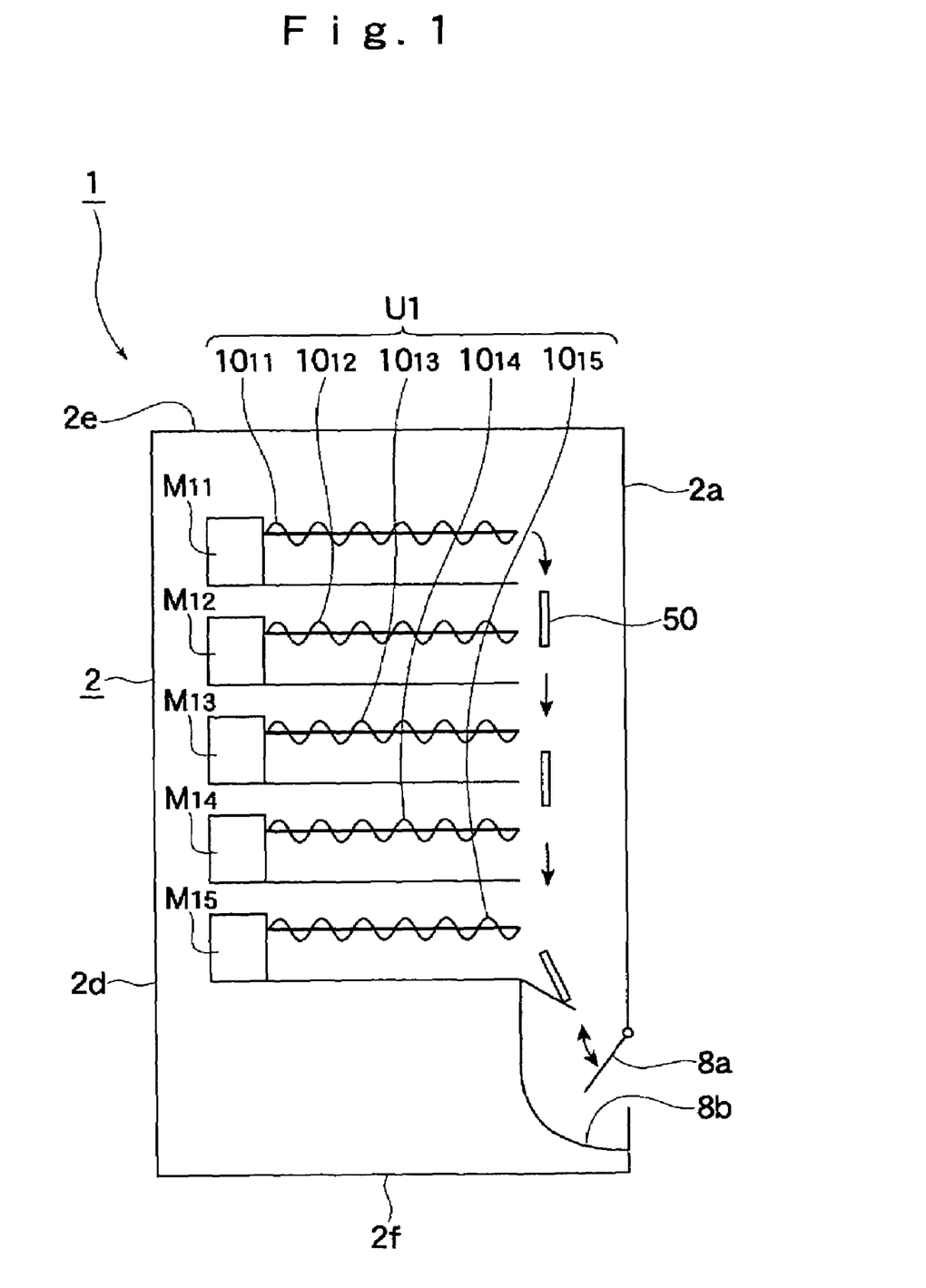
FIG. 1 is a side view schematically showing an essential part of an article transfer device according to one embodiment of the present invention.
Figure 2:
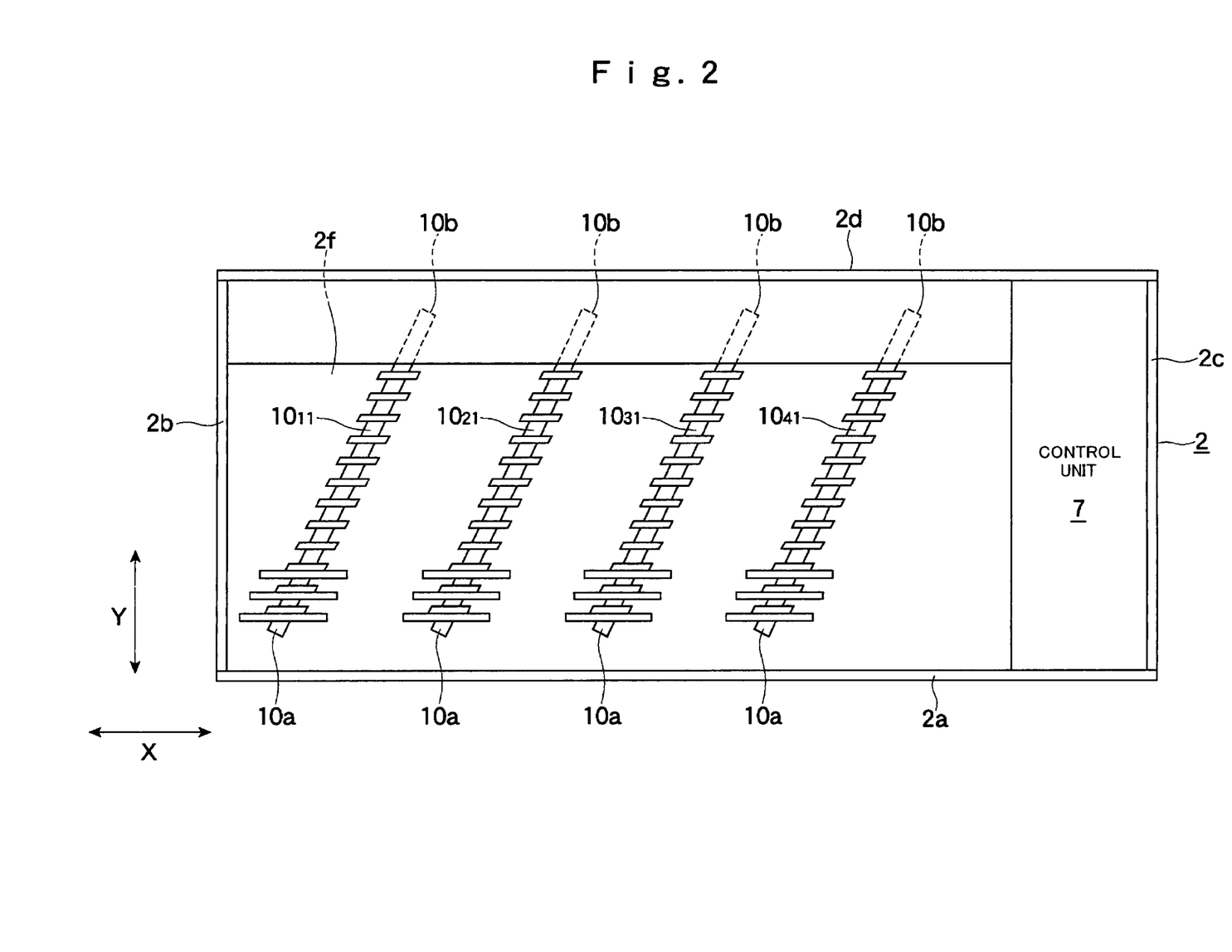
FIG. 2 is a plan view schematically showing an essential part of the article transfer device according to the embodiment of the present invention.
Figure 3:
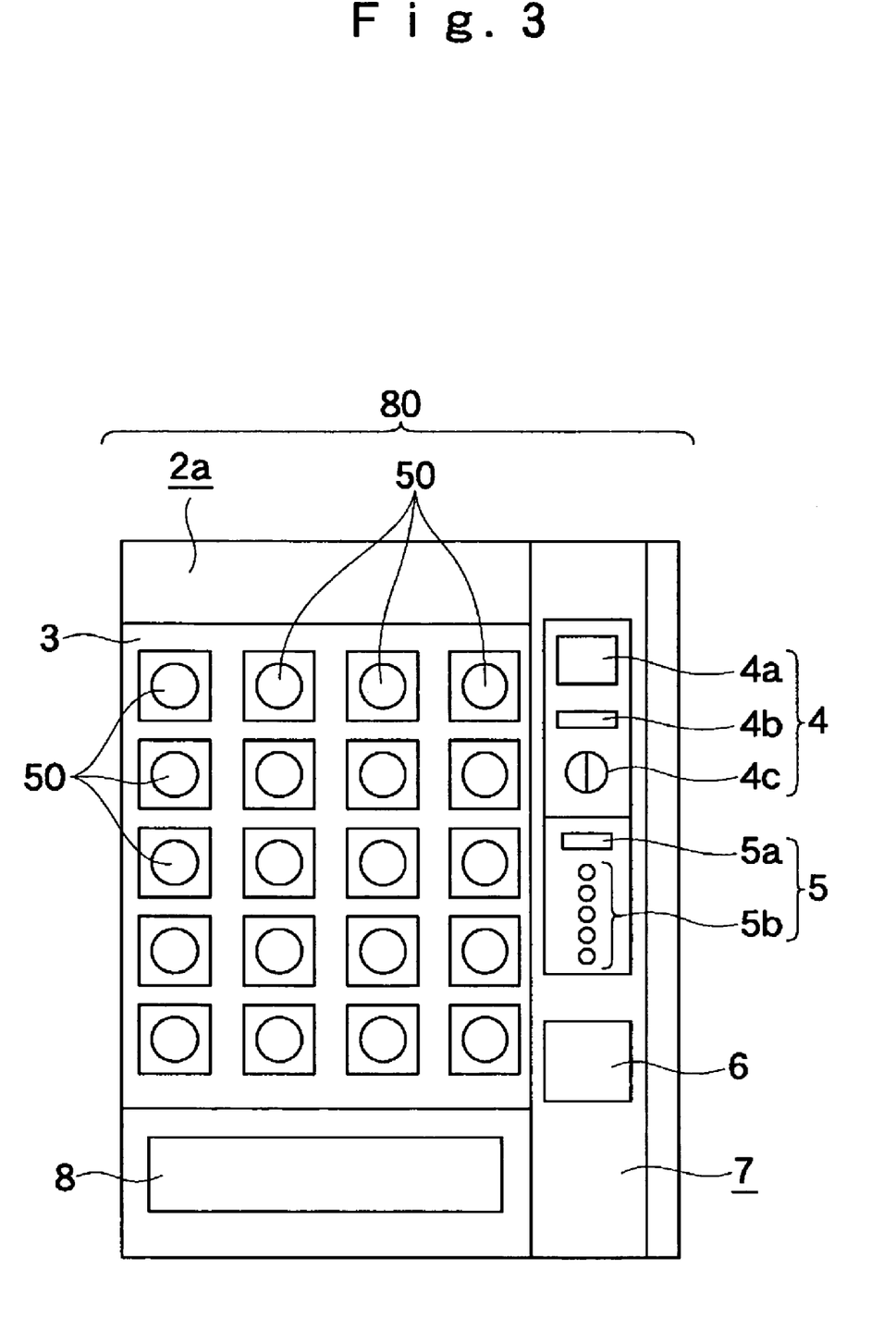
FIG. 3 is a front view schematically showing an essential part of the article transfer device according to the embodiment of the present invention.

FIG. 1 is a side view schematically showing an essential part of an article transfer device 1 according to one embodiment, FIG. 2 is a plan view schematically showing an essential part of the article transfer device 2 according to the embodiment and FIG. 3 is a front view schematically showing an essential part of the article transfer device 1 according to the embodiment. This article transfer device 1 constitutes a vending machine in which from a plurality of respective hanger rods 10 ($10_{21}$, $10_{31}$, $10_{41}$ and the like) described later, as articles, a plurality of packaged commodities 50 in which DVD (Digital Versatile Disc), CD (Compact Disc) and the like are packaged can be suspended, wherein upon insertion of the coins, each hanger rod 10 is rotated so as to transfer respective commodities 50 suspended from each hanger rod thus falling the commodities 50 and the fallen commodities 50 can be taken out.

The article transfer device 1 includes a housing 2. In the inside of the housing 2, the plurality of hanger rods 10, drive devices 21 to 24 which are served for rotating the respective hanger rods 10 about axes thereof, and other respective constitutional elements described later are accommodated.

The housing 2 includes a face panel 2a which constitutes a front surface, left and right side panels 2b, 2c, a back panel 2d, and a top panel 2e and a bottom panel 2f, wherein in the inside of a rectangular parallelepiped space defined by these panels, the constitutional elements such as the plurality of hanger rods 10 are accommodated.

As shown in FIG. 3, the face panel 2a is formed of an acrylic plate, a glass plate or the like for allowing the viewing of the commodities 50 which are suspended from the respective hanger rods 10 with naked eyes, wherein the face panel 2a includes a commodity display unit 3 formed of a transparent flat panel, a control unit 7 and a commodity take out opening 8.

The commodity display unit 3 includes, on a rear-side thereof, a hanger rod unit U1 which includes five hanger rods 10 ($10_{11}$ to $10_{15}$) which are arranged in parallel vertically. Further, in the commodity display unit 3, in the same manner as the hanger rod unit U1, hanger rod units U2, U3, U4 which respectively include hanger rods $10_{21}$ to $10_{25}$, hanger rods $10_{31}$ to $10_{35}$ and hanger rods $10_{41}$ to $10_{45}$ (see FIG. 4) which are arranged in parallel vertically are arranged in parallel laterally. Here, the respective commodities 50 which are suspended from the respective hanger rods of the respective hanger rod units U1 to U4 can be observed from the outside with naked eyes. In the respective hanger rod units U1 to U4, five hanger rods 10 are arranged in a row at a given interval in the vertical direction. Here, FIG. 1 illustrates the hanger rod unit U1 and, on the rear side of the commodity display unit 3, the hanger rod units U2, U3, U4 having the substantially same constitution are arranged laterally.

The control unit 7 is arranged on the right side of the article display unit 3 and includes a money insertion part 4, a commodity selection part 5 and a change discharge part 6 which are arranged in order from above. The money insertion part 4 includes an amount display portion 4a, a bill insertion opening 4b and a coin insertion opening 4c. The amount display portion 4a includes a liquid crystal display device which displays an amount of money which a person who wants to purchase a commodity 50 (hereinafter referred to as "purchaser") inserts. A bill identifying device 4d (see FIG. 6) described later is incorporated in the bill insertion opening 4b. The coin insertion opening 4c is configured to allow the purchaser to insert coins and is connected with first and second coin selectors 4e, 4f described later.

The commodity selection part 5 constitutes a selection means in the present invention and is served for inputting information necessary for identifying a commodity which the purchaser wants to purchase among the commodities 50 which are suspended from the respective hanger rods 10. The commodity selection part 5 includes a unit designation part 5a for designating any one of the hanger rod units U1 to U4 and a number designation part 5b which designates the hanger rods 10 (numbers 1 to 5 being attached to the hanger rods 10) in each one of hanger rod units U1 to U4. The change discharge part 6 discharges the change of money which the purchaser inserts. The commodity takeout opening 8 includes, as shown in FIG. 1, an open/close door 8a which can be pushed up and an accommodating portion 8b which accommodates the commodity 50 fallen from the hanger rod 10. By pushing up the open/close door 8a from the outside of the housing 2, it is possible to take out the commodity accommodated in the accommodating portion 8b.

Twenty hanger rods 10 in total are arranged such that five hanger rods 10 are allocated to each one of hanger rod units U1 to U4. Each hanger rod 10 forms, as shown in FIG. 2, an open-end portion 10a on a face panel-2a side and a support end portion 10b on a back-panel-2d side. Further, the support end portions 10b are rotatably supported using drive devices 21 to 24 such that the hanger rods 10 are rotatable about axes thereof in each one of hanger rod units U1 to U4.

Due to such a constitution, even when the article transfer device 1 includes a plurality of hanger rods 10, it is possible to feed the suspended commodity 50 by selecting each hanger rod 10 and by rotating the selected hanger rod 10.

Figure 4:
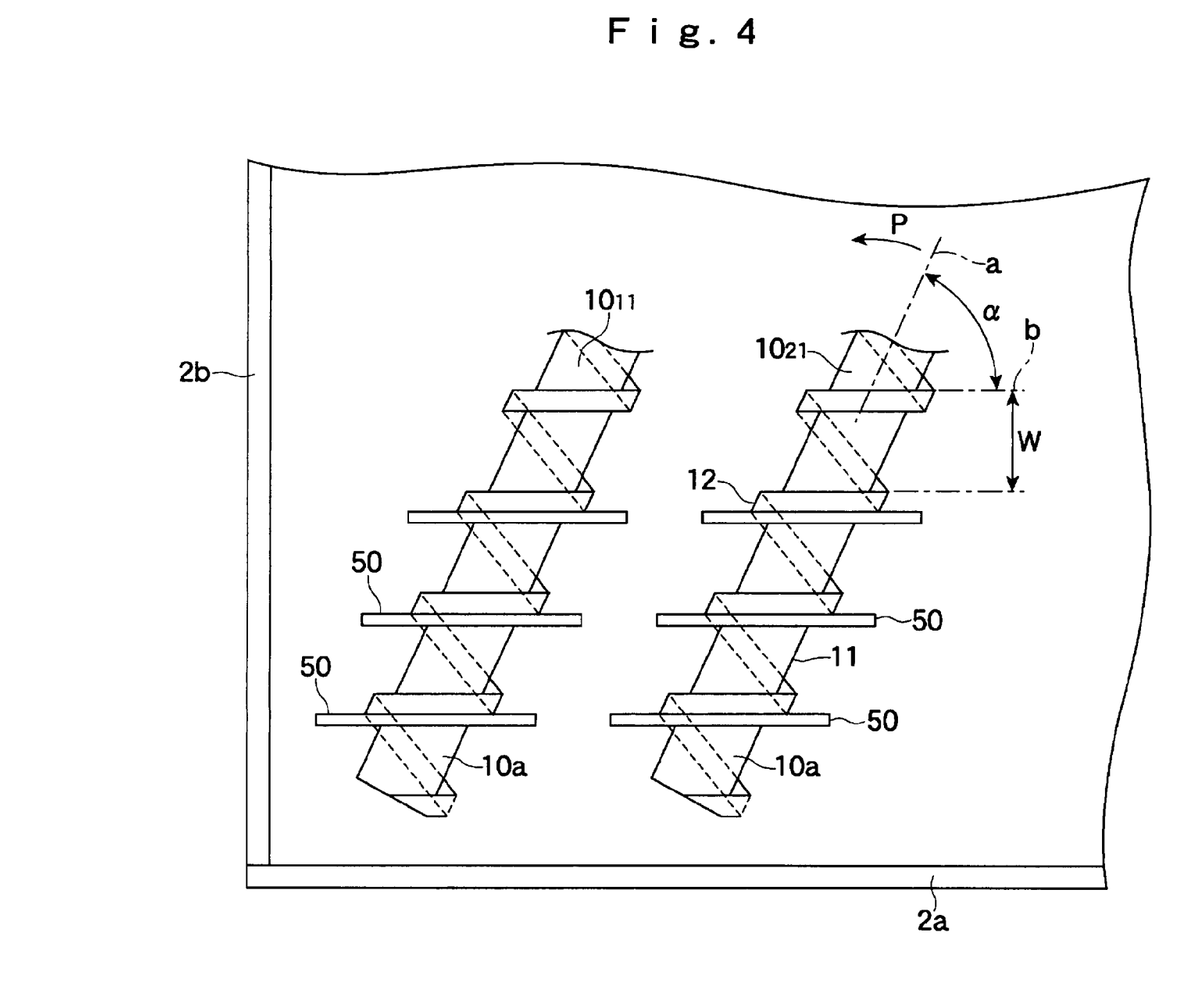
FIG. 4 is a partially enlarged view of FIG. 2.

Further, as shown in FIG. 2 and also FIG. 4 which shows a portion of FIG. 2 in an enlarged manner, the respective hanger rods 10 (the hanger rods 10 which are arranged at the same height and in parallel to each other within the hanger rod units U1 to U4) have the directions of axes "a" of the hanger rods 10 set obliquely with respect to the front-to-rear direction (the Y direction in FIG. 2) of the housing 2 by shifting a support end portion 10b side thereof in the right direction than the open end portion 10a thereof whereby the respective hanger rods 10 are arranged to be rotatable with the axes "a" thereof set obliquely. (Hereinafter, this arrangement is referred to as "arrangement about oblique axes"). By adopting the arrangement about oblique axes, the axis "a" and a reference line "b" which is arranged parallel to the direction which extends along the face panel 2a (the X direction in FIG. 2) make a predetermined angle α. In the article transfer device 1 of this embodiment, the predetermined angle α is set such that the helical ridges 12 (to be more specific, side wall portions of the helical ridges 12) described later become substantially parallel to the reference line "b" and hence, becomes substantially parallel to the direction which extends along the face panel 2a.

As described above, in this article transfer device 1, the respective hanger rods 10 are arranged in a state that the helical ridges or helical grooves are arranged substantially in parallel to the direction along a face panel constituting a front surface of the housing 2.

Since the commodities 50 which are suspended from the hanger rods 10 are transferred or fed by the helical ridges or the helical grooves, due to the above-mentioned provision, the commodities 50 are allowed to substantially directly face the front surface of the housing 2.

Figure 5A:
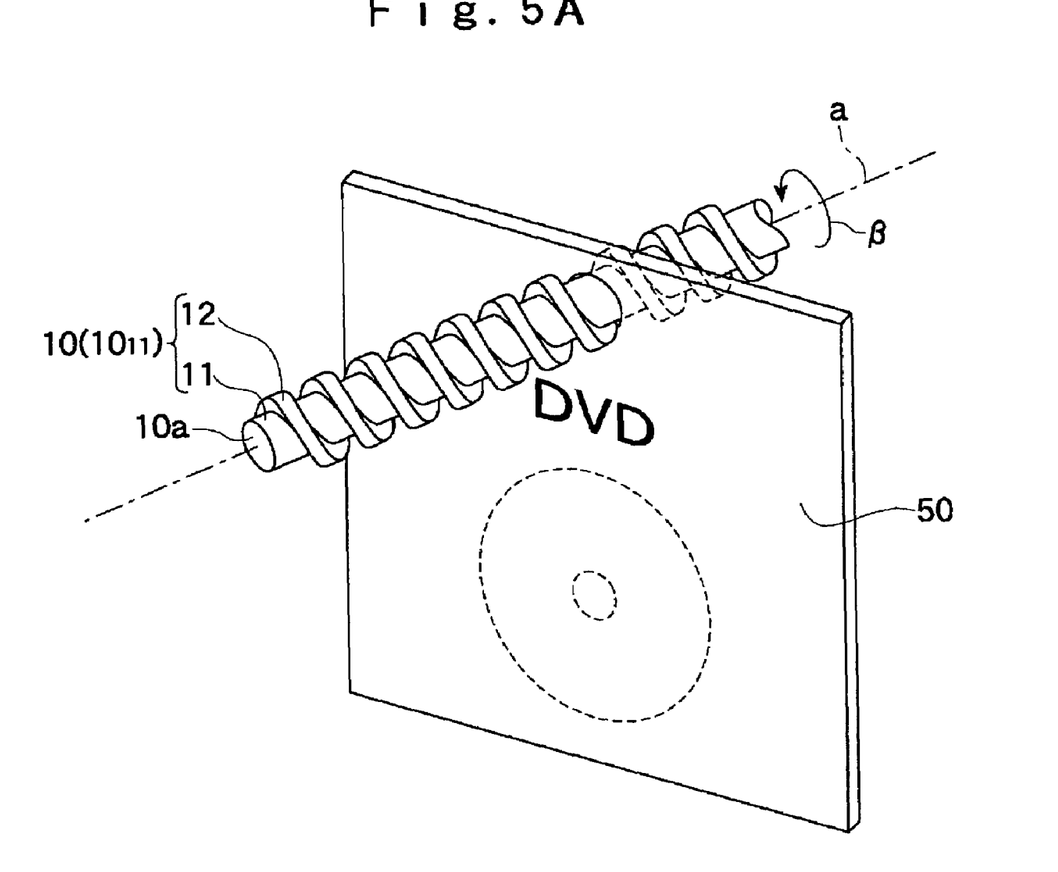
FIG. 5A is a perspective view with a part omitted of the hanger rod and the suspended commodity and FIG. 5B is a side view showing the hanger rod and the suspended commodity.
Figure 5B:
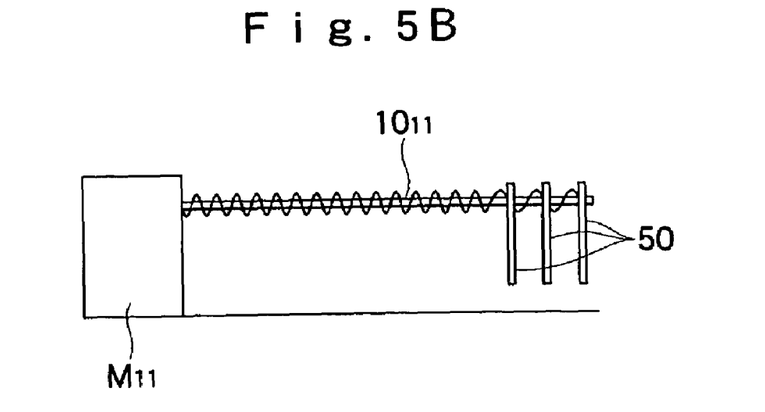

Further, each hanger rod 10 forms, as also shown in FIG. 5A, helical ridges 12 which extend helically or spirally along the axis "a" on a rod-like proximal portion 11 thereof. As shown in FIG. 5B, the commodities 50 are suspended from portions having no helical ridges 12 in the proximal portion 11 (the portions constituting helical grooves which extend spirally along the axes), wherein by rotating the hanger rod 10 about the axis (the direction "β" in FIG. 5A), it is possible to transfer or feed the commodities 50 by pushing the commodities 50 with the helical ridges 12. The helical ridges 12 are formed such that, by rotating the hanger rod 10 in the direction "β", the helical ridges 12 advance toward the open-end-portion-10a side and transfer the commodities 50.

The helical ridges 12 may suitably change the length or the size of the arrangement interval (the arrangement pitch w: see FIG. 4) in conformity with the shape and the size of the commodity 50. By narrowing an arrangement pitch "w", the number of the helical ridges 12 is increased and hence, the number of the commodity 50 which can be suspended from the hanger rod 10 can be increased. As an opposite case, by widening the arrangement pitch "w", the number of the helical ridges 12 is decreased and hence, the number of the commodity 50 which can be suspended from the hanger rod 10 becomes smaller. In both cases, according to this embodiment, the helical ridges 12 are arranged substantially parallel to the direction which extends along the face panel 2a.

Further, for example, by setting the arrangement pitch "w" narrower than the value set in FIG. 4, the direction of the helical ridges 12 is changed and the inclination of the helical ridges 12 with respect to the axis "a" of the hanger rod 10 is enlarged (the predetermined angle α is enlarged). Accordingly, to arrange the helical ridges 12 substantially parallel to the direction which extends along the face panel 2a, the inclination of the axis "a" may be increased (by inclining the axis "a" in the direction P).

Figure 6:
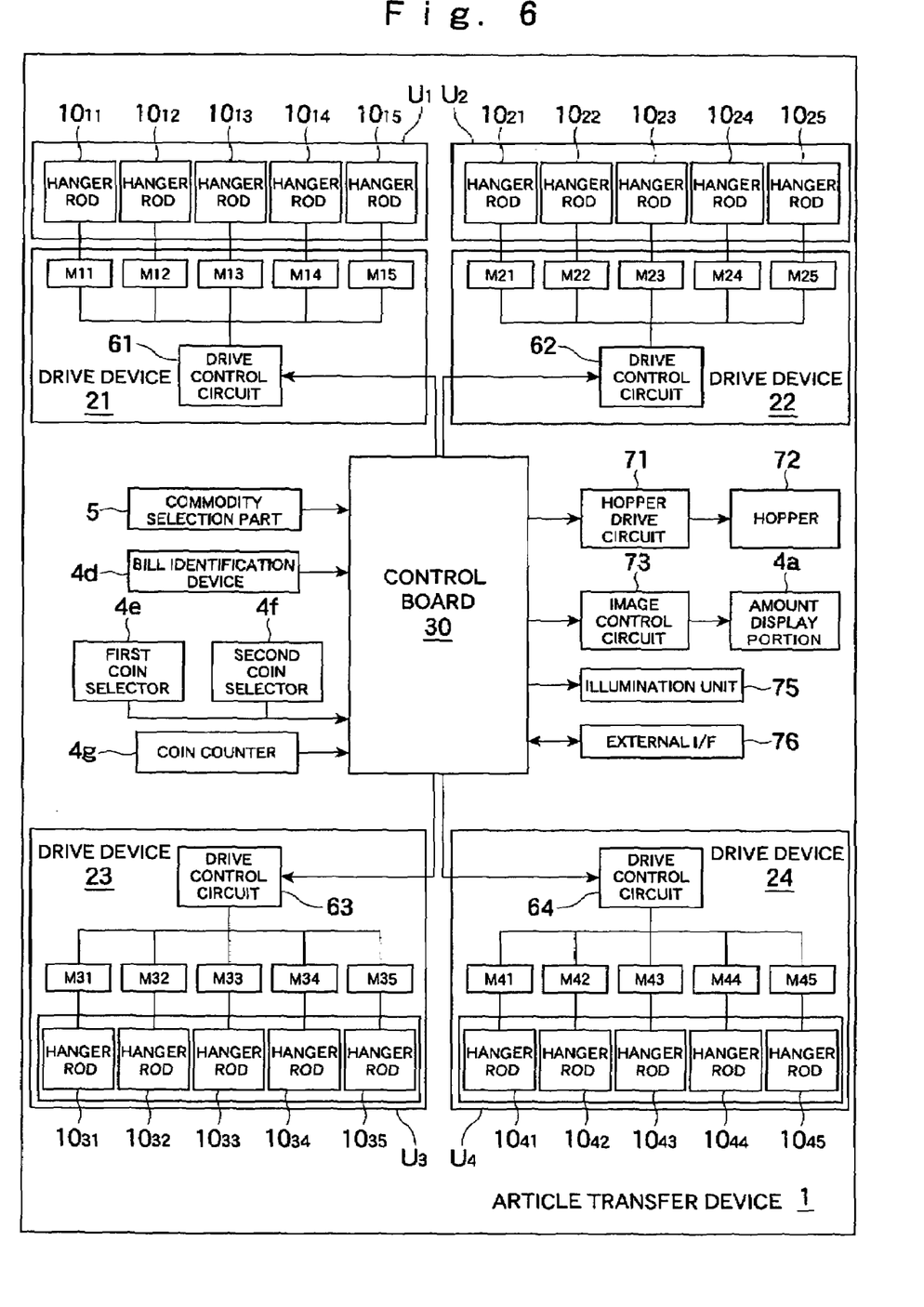
FIG. 6 is a block diagram showing the inner constitution of the article transfer device.

FIG. 6 is a block diagram showing the inner constitution of the article transfer device 1. The article transfer device 1 is mainly constituted of a control board 30 and includes a plurality of constitutional elements besides the above-mentioned constitutional elements.

The control board 30 constitutes a control unit according to the present invention and includes a CPU (Central Processing Unit), a RAM (Random Access Memory) and a ROM (Read Only Memory). The CPU is operated in accordance with a program stored in the ROM so as to perform the inputting and outputting of signals with other constitutional elements thus performing an operational control of the whole article transfer device 1. The RAM stores data and a program which are used when the CPU is operated, while the ROM stores a program which the CPU executes and permanent data.

Further, the article transfer device 1 includes the drive devices 21, 22, 23, 24. The respective drive devices 21 to 24 include supporters which support one-end sides of five hanger rods $10_{11}$ to $10_{15}$, five hanger rods $10_{21}$ to $10_{25}$, five hanger rods $10_{31}$ to $10_{35}$ and five hanger rods $10_{41}$ to $10_{45}$ provided to the respective hanger rod units U1 to U4 in a cantilever manner such that the hanger rods are rotatable about axes thereof, and support drive parts M11 to M15, support drive parts M21 to M25, support drive parts M31 to M35 and support drive parts M41 to M45 which include power parts such as motors, solenoids or the like for rotating the hanger rods about axes thereof and power transmission units such as gears, belts or the like. Further, the respective drive devices 21 to 24 include drive control circuits 61, 62, 63 and 64 respectively. The support drive parts M11 to M15, the support drive parts M21 to M25, the support drive parts M31 to M35 and the support drive parts M41 to M45, upon receiving inputting of drive signals from the respective drive control circuits 61, 62, 63 and 64, rotate the respective hanger rods 10 about axes thereof by a predetermined angle. Upon receiving the inputting of control signals from the control board 30, the drive control circuits 61, 62, 63 and 64 output drive signals to the power parts such as motors of the support drive parts corresponding to the inputted control signals.

Further, the article transfer device 1 includes a bill identification device 4d, first and second coin selectors 4e, 4f, a coin counter 4g, a hopper drive circuit 71 and a hopper 72. The bill validation device 4d performs the genuineness determination and the denomination determination of the bills which are inserted through the bill insertion opening 4b and outputs a signal showing results of these determinations to the control board 30 and at the same time, includes a stocker (not shown in the drawing) which preserves the inserted bills. The first and second coin selectors 4e, 4f respectively perform the genuineness determination and the selection of coins inserted through the coin insertion opening 4c, and store the selected coins in the stockers. The coin counter 4g counts the number of coins corresponding to the selection and outputs a result of counting to the control board 30.

The hopper drive circuit 71 drives the hopper 72 in accordance with a control performed by the control board 30, wherein the hopper 72 performs an operation for paying out an amount of money corresponding to the change information inputted from the hopper drive circuit 71 and pays out the money from the change discharge part 6.

Further, the article transfer device 1 includes an image control circuit 73 which performs a control for displaying an image indicative of the inserted amount on the amount display portion 4a, an illumination unit 75 such as a cold cathode ray tube or the like which radiates light and brightens the inside of the commodity display part 3, and an external I/F unit 76 for performing the communication with an external equipment not shown in the drawing.

(Explanation of Manner of Operation of Article Transfer Device)

Next, contents of the manner of operation of the article transfer device 1 having the above-mentioned constitution are explained.

When the purchaser inserts an amount of money corresponding to a price of commodity into the bill insertion opening 4*b* or the coin insertion opening 4*c*, the article transfer device 1 is operated as follows.

The article transfer device 1 performs the determination of denomination and the genuineness of the inserted money using the bill validation device 4*d* or performs the determination of genuineness and the selection of the inserted coins using the first and second coin selectors 4*e*, 4*f*. Further, the coin counter 4*g* performs the counting of the number of coins. The money information indicative of these results is inputted into the control board 30. The control board 30 grasps the amount from the money information and instructs the image control circuit 73 to display an image indicative of the amount (for example, "¥5,000"). In accordance with the instruction of the image control circuit 73, the numbers of the inserted amount are displayed on the amount display portion 4*a*.

Next, the purchaser watches the commodities 50 in the inside of the commodity display part 3 from the outside and selects the desired commodity and, thereafter, decides the hanger rod 10 in which the commodity 50 which the purchaser desires is stored out of the hanger rod units U1 to U4 and the numbers 1 to 5. Then, to specify the commodity 50, the purchaser performs the inputting of manipulation by manipulating the commodity selection part 5. As the result, the selection information indicative of the selected hanger rod 10 is inputted to the control board 30 from the commodity selection part 5. The control board 30, based on the selection information, specifies the hanger rod unit U1 to U4 and the numbers, that is, the hanger rod 10 which suspends the commodity 50 which the purchaser selects (this specified hanger rod 10 constituting the selected hanger rod 10 according to the present invention), and an instruction signal is inputted to the drive control circuit corresponding to the selected hanger rod 10 out of the drive control circuits 61 to 64.

Then, any one of the drive control circuits 61 to 64 to which the instruction signal is inputted outputs a drive signal to the power part such as the motor or the like of the corresponding support drive part and hence, the power part such as the motor rotates the selected hanger rod 10 about an axis thereof. Then, due to the rotation of the selected hanger rod 10 which is connected to the support drive part about an axis thereof in the direction of β, the helical ridge 12 transfers or feeds the commodity 50 and, as shown in FIG. 1, the commodity 50 which is suspended from the distal end is removed from the selected hanger rod 10 and falls downwardly in the inside of the housing 2 due to the gravity thereof in the inside of the housing 2, and is stored in the commodity takeout part 8. The purchaser can take out the fallen commodity 50 from the commodity takeout part 8. Further, in response to the fall of the commodity 50 due to the rotation of the selected hanger rod 10, the change is calculated by the control board 30 and the hopper drive circuit 71 is instructed to pay out the money corresponding to the amount and hence, the change is paid out from the hopper 72.

Figure 8A:
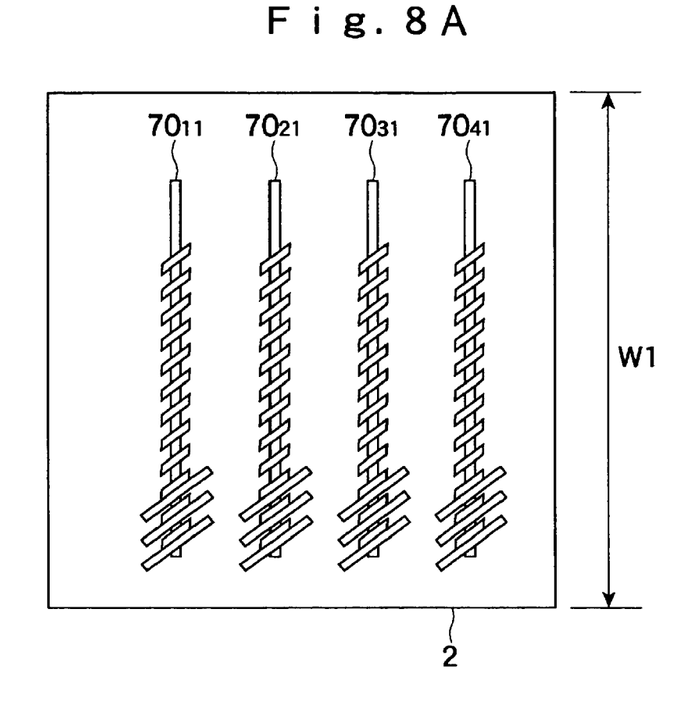
FIG. 8A is a plan view schematically showing a conventional article transfer device and FIG. 8B is a plan view schematically showing an article transfer device according to this embodiment.
Figure 8B:
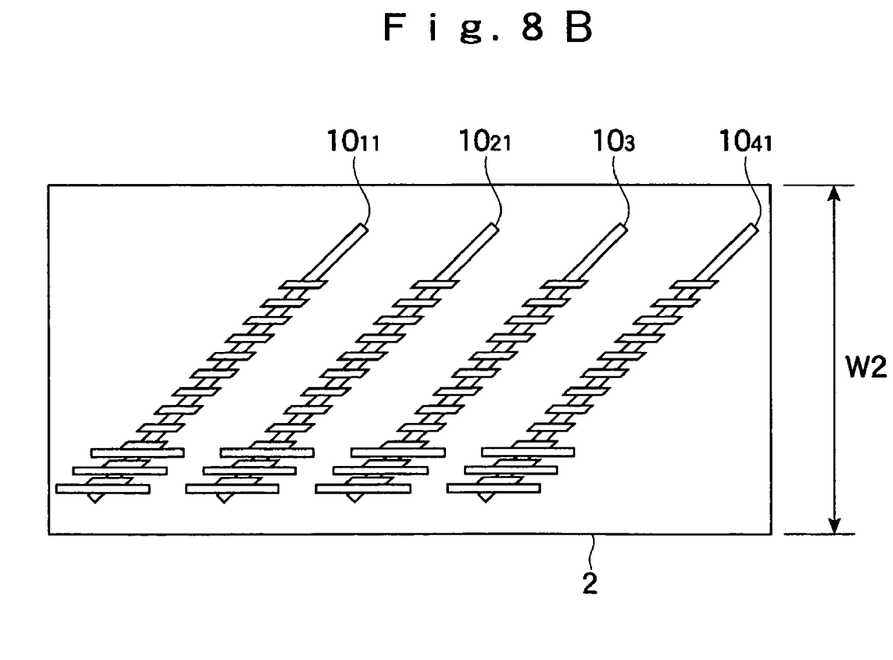

In the above-mentioned case, while the article transfer device 1 includes the plurality of hanger rods 10, as described above, the respective hanger rods 10 have the direction of axes thereof set obliquely with respect to the front-to-rear direction of the housing 2 (the Y direction in FIG. 2) and are rotatable about the oblique axes. Accordingly, compared to a depth W1 of the housing 2 in a conventional case in which the respective hanger rods 10 are arranged in parallel in the front-to-rear direction of the housing (FIG. 8(*b*)), as shown in FIG. 8A, the article transfer device 1 of this embodiment can narrow (shorten) a depth W2 of the housing 2 (W1>W2). Accordingly, even when the housing 2 is made thin by narrowing the depth W2 thereof, the article transfer device can ensure the sufficient number of commodities 50 which can be suspended from the hanger rods 10.

Further, since hanger rods 10 adopt the arrangement about oblique axes in the article transfer device 1, the helical ridges 12 (the side wall portions of the helical ridges 12) face in the direction toward the face panel 2*a* whereby the commodities 50 suspended from the hanger rods 10 also face toward the face panel 2*a*.

Figure 9A:
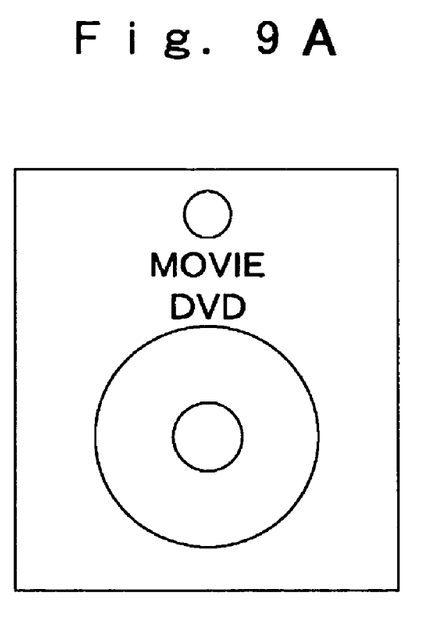
FIG. 9A is a front view showing a commodity suspended by the article transfer device according to this embodiment and FIG. 9B is a front view showing a commodity suspended from a conventional article transfer device.
Figure 9B:
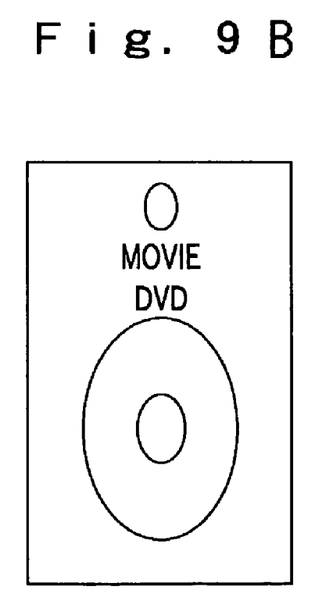

Further, the helical ridges 12 (the side wall portions of the helical ridges 12) are arranged in substantially parallel to the direction which extends along the face panel 2*a* and hence, the suspended commodities 50 substantially directly face the front surface of the housing 2. Accordingly, as shown in FIG. 9A, when the article transfer device 1 is observed from the front surface of the housing 2, the suspended commodities 50 appear to directly face the front surface of the housing 2. To the contrary, in the conventional article transfer device (vending machine), as shown in FIG. 9B, the commodities are directed in the oblique direction with respect to the face panel.

As can be understood from the comparison of these two article transfer devices, the article transfer device 1 according to this embodiment can allow the suspended commodities to directly face the front surface of the housing 2 and hence, the commodity can be easily observed from the outside.

In the above-mentioned article transfer device 1, four hanger rod units U1 to U4 are provided for one set of manipulation panel 7 and each unit has five hanger rods 10. However, in the article transfer device 1, the number of hanger rod units is not limited to four and can be increased or decreased and, at the same time, the number of hanger rods 10 in the inside of each unit can be also increased or decreased.

Further, as mentioned above, it is unnecessary to provide the power parts such as motors for the respective hanger rods 10 in each unit and the respective hanger rods 10 in each unit may be driven using a single motor or the like.

Figure 7:
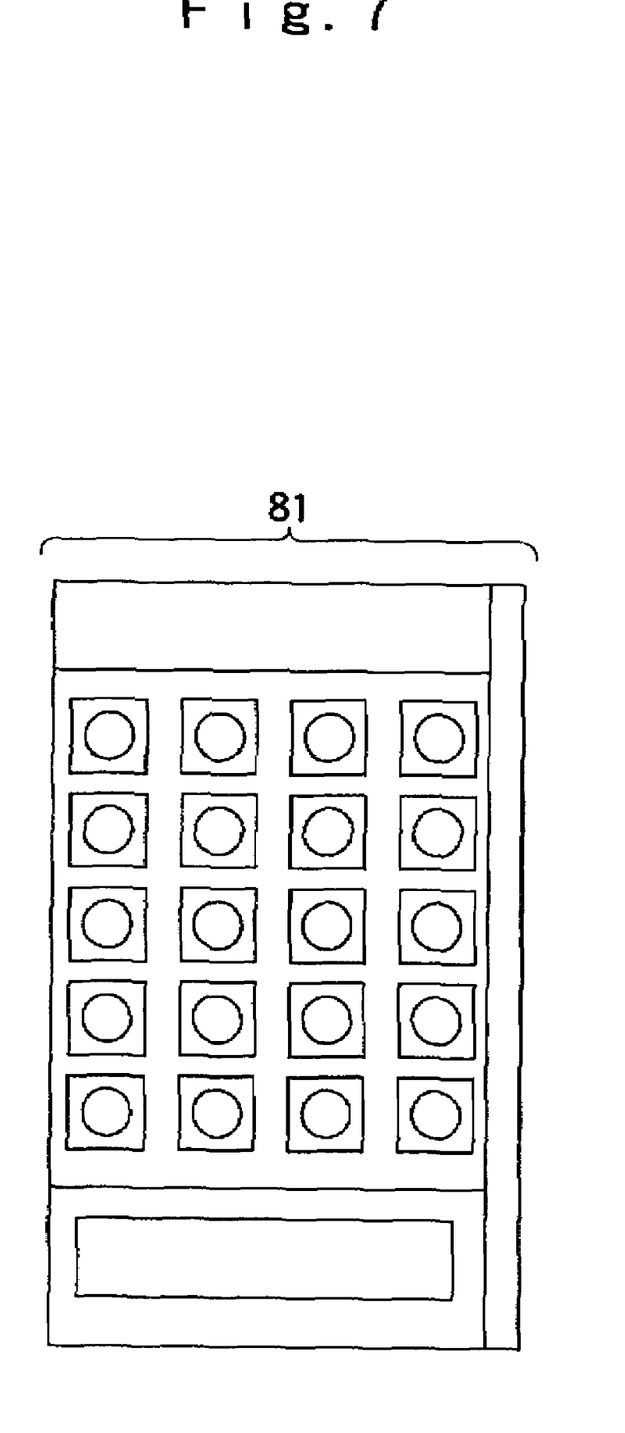
FIG. 7 is a front view showing an expansion unit of the article transfer device.
Figure 10:
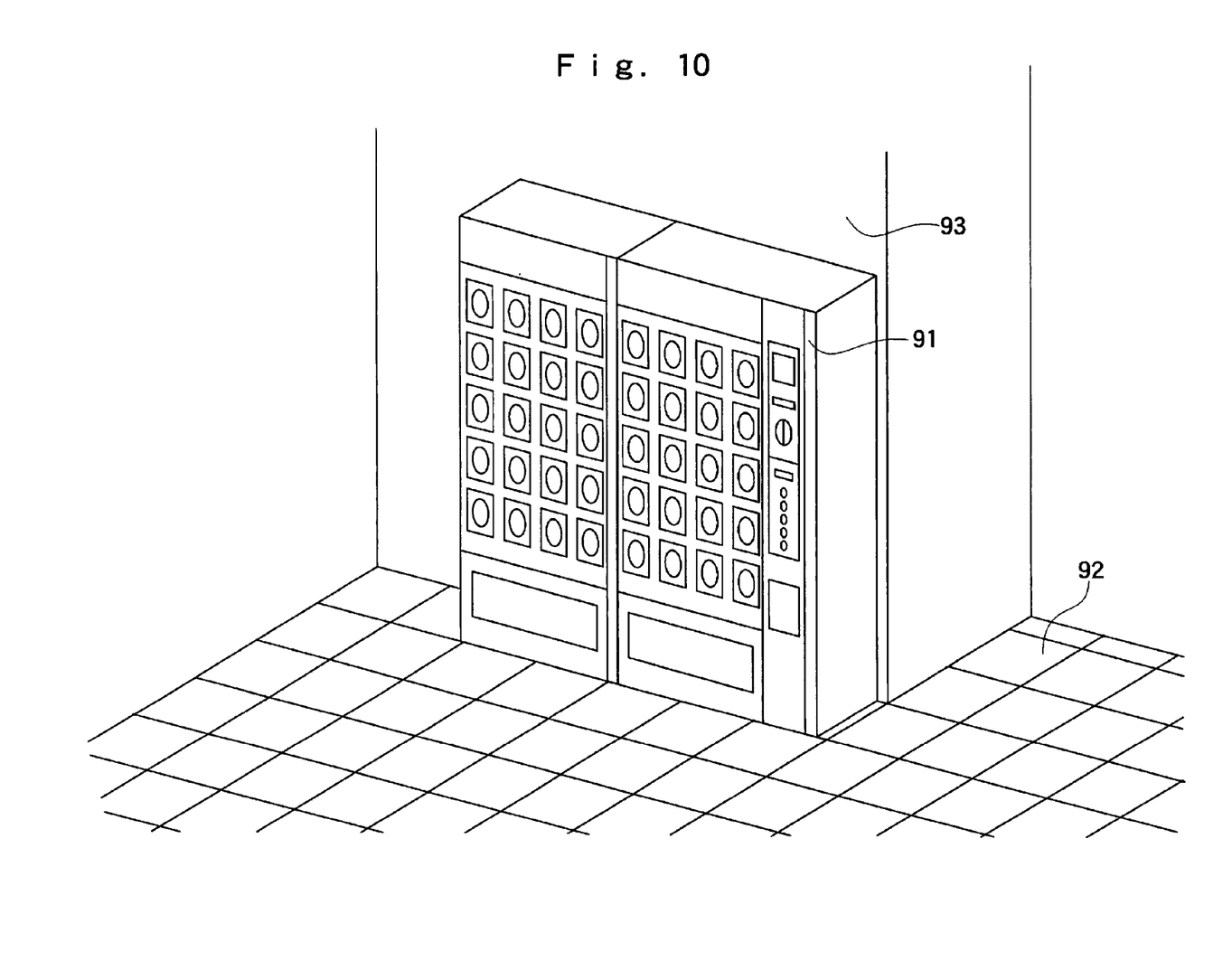
FIG. 10 is a perspective view showing one example of a mounting state of the article transfer device to which an expansion unit is additionally provided.

In this case, it is sufficient to provide one set of the manipulation panel 7 with respect to all hanger rods 10. For example, using the article transfer device 1 shown in FIG. 3 as a basic unit 80 and providing an expansion unit 81 having no manipulation panel 7 as shown in FIG. 7, an arbitrary number of expansion units 81 may be additionally installed on the basic unit 80. For example, as shown in FIG. 10, an article transfer device 91 may be provided by additionally installing one expansion unit 81 to the basic unit 80 and the article transfer device 91 may be mounted on a floor surface 92. Also in this case, in the article transfer device 91, the respective hanger rods 10 adopt the arrangement about the oblique axes, the depth of the housing 2 can be narrowed. Accordingly, it is possible to prevent the projection of a back surface of the article transfer device 1 from a wall surface 93 and hence, it is possible to sell a large number of commodities in a suspended manner while ensuring the thin shape.

In the above-mentioned article transfer device 1, the helical ridges 12 are arranged in substantially parallel to the direction which extends along the face panel 2*a* of the housing 2. However, by allowing the respective hanger rods 10 to adopt the arrangement about the oblique axes, it is possible to direct the suspended commodities 50 to face the front surface of the housing 2 and hence, the observation of the commodities 50 can be facilitated. Accordingly, it is sufficient to arrange the respective hanger rods 10 about the oblique axes and it is not always necessary to arrange the helical ridges 12 in substantially parallel to the direction which extends along the face panel 2*a*. However, by arranging the helical ridges 12 in parallel to or in substantially parallel to the direction which extends along the face panel 2*a*, it is possible to direct the suspended commodities 50 to substantially face the front surface of the housing 2 and hence, the observation of the commodities 50 is further facilitated. Accordingly, it is preferable to arrange the helical ridges 12 in parallel to or in substantially parallel to the direction which extends along the face panel 2*a*.

Further, in the above-mentioned article transfer device 1, the explanation has been made with respect to the case in which the commodity selection part 5 includes the unit designation part 5*a* and the number designation part 5*b*. However, the commodity selection part 5 may have an input key which individually inputs numbers from 0 to 9.

In place of the money insertion part 4, it is possible to use a card reader/writer which reads and writes a prepaid card or a credit card and inputs the money information into the control board 30. Alternatively, it is possible to use means which performs the radio transmission/reception with a mobile communication means having the radio communication function of money information such as a mobile phone or the like and inputs the money information to the control board 30.

Figure 11:
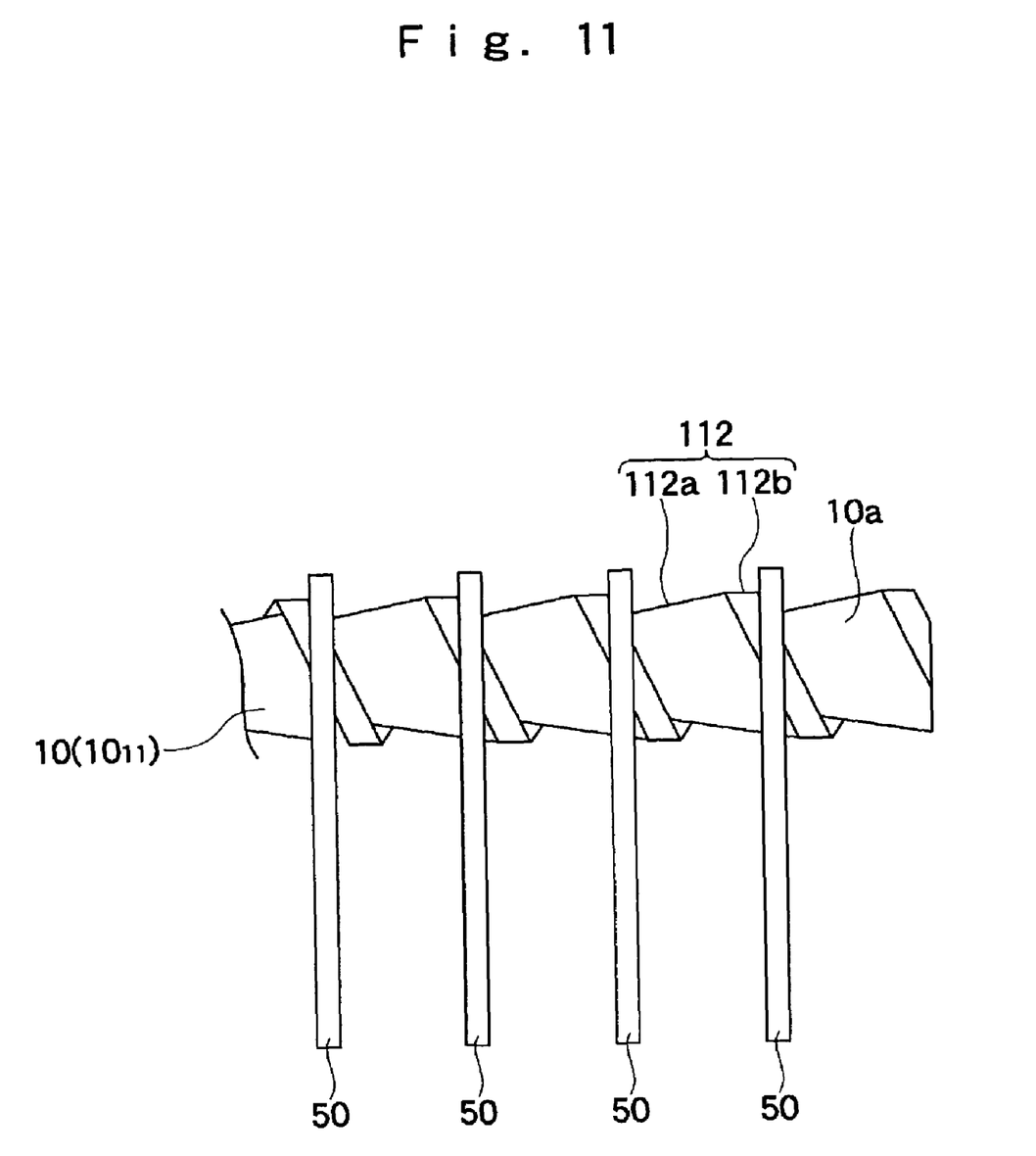
FIG. 11 is a view showing another hanger rod and the side view of the commodity suspended from another hanger rod.

Further, the hanger rod 10 may, as shown in FIG. 11, include inclined helical ridges 112 which are constituted of helical ridges 112*a* similar to the helical ridges 12 and inclined portions 112*b* each of which is inclined toward the open-end portion 10*a* between respective helical ridges 112*a* along the surface of the proximal portion 11. By forming such inclined helical ridges 112 on the hanger rod 10, the suspended commodities 50 are moved toward the support end portion 10*b* side along the inclined portions 112*b* due to the own weight whereby the commodities 50 are easily arranged along the respective helical ridges 112*a*. Accordingly, it is possible to easily hold the distance between the respective commodities 50 to a given size.

Although the article transfer device 1 has been explained as the vending machine which sells suspended commodities, the present invention is applicable to a device which displays commodities in a suspended manner.

What is claimed is:

1. An article transfer device comprising:
    a plurality of hanger rods, each hanger rod having a length for suspending a plurality of articles, a central axis that is substantially horizontal, and a helical surface structure spirally extending on the hanger rod along the center axis;
    a driver which rotates the hanger rods about their central axes; and
    a housing having a planar substantially vertical transparent face panel, said housing accommodating the hanger rods and the driver, wherein the central axes of the hanger rods lie within substantially horizontal planes and are positioned at oblique angles, within the horizontal planes, with respect to the transparent face panel of the housing.

2. The article transfer device according to claim 1, wherein the helical structures include walls protruding from and transverse to the hanger rods, the walls being substantially parallel to the transparent face panel of the housing.

3. The article transfer device according to claim 1, further including:
    a selection unit which selects any one of the hanger rods; and
    a control unit which operates the driver corresponding to the hanger rod selected to rotate the hanger rod selected about the central axis of the hanger rod selected.

4. The article transfer device according to claim 2, including:
    a selection unit which selects any one of the hanger rods; and
    a control unit which operates the driver corresponding to the hanger rod selected to rotate the hanger rod selected about the central axis of the hanger rod selected.

5. The article transfer device according to claim 1, wherein each of the hanger rods includes a support end remote from the face panel and supported by the driver and an open end proximate the face panel and unsupported.

6. The article transfer device according to claim 2, wherein each of the hanger rods includes a support end remote from the face panel and supported by the driver and an open end proximate the face panel and unsupported.

7. The article transfer device according to claim 3, wherein each of the hanger rods includes a support end remote from the face panel and supported by the driver and an open end proximate the face panel and unsupported.

8. The article transfer device according to claim 4, wherein each of the hanger rods includes a support end remote from the face panel and supported by the driver and an open end proximate the face panel and unsupported.

* * * * *